July 21, 1959
B. A. KARRY
2,895,251
ATTACHMENT FOR FISHING RODS
Filed Nov. 21, 1956
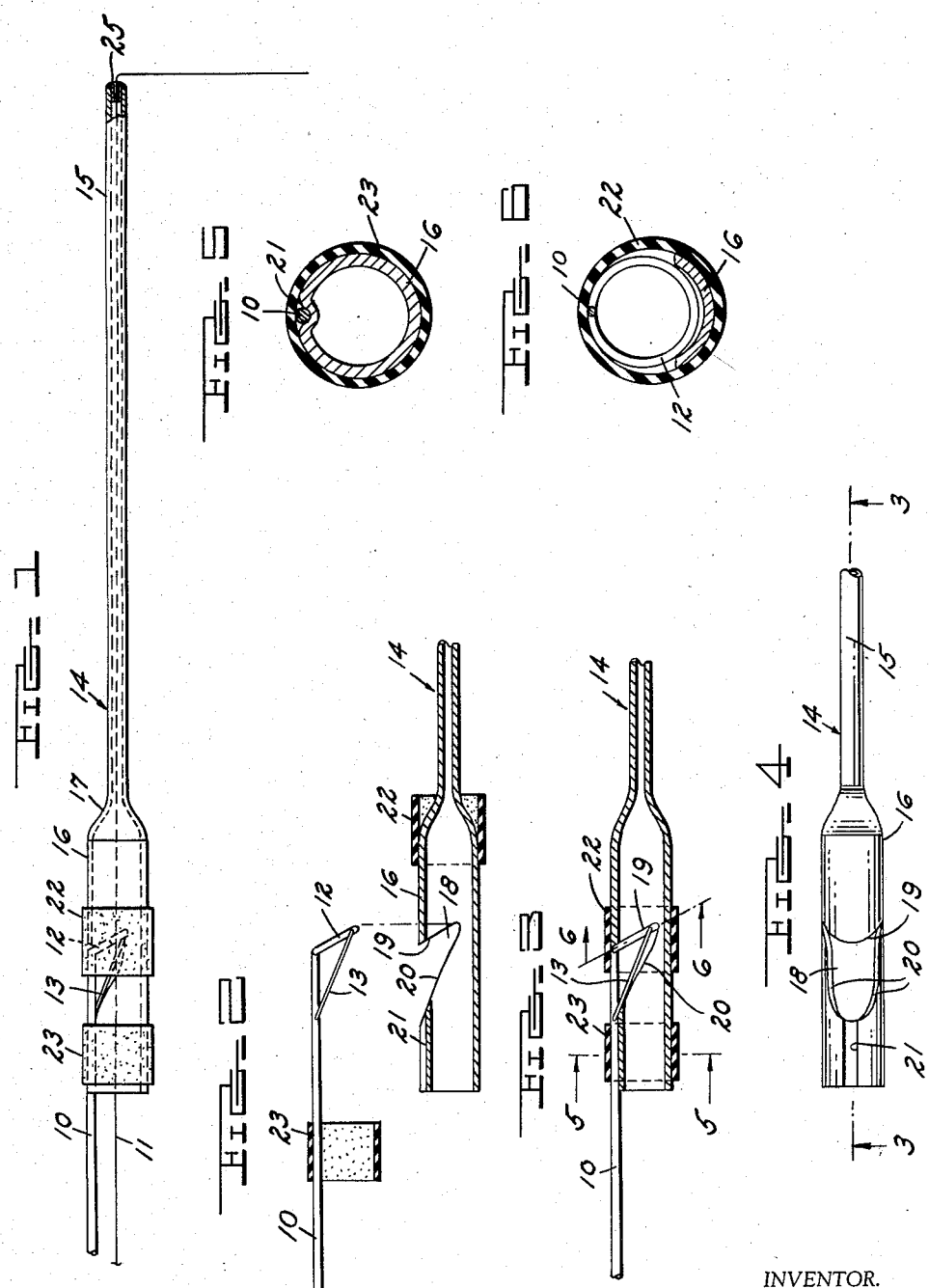
INVENTOR.
BERT A. KARRY
BY
ATTORNEYS

2,895,251
ATTACHMENT FOR FISHING RODS

Bert A. Karry, Livonia, Mich.

Application November 21, 1956, Serial No. 623,627

9 Claims. (Cl. 43—24)

This invention relates to fishing rods and particularly to an attachment for fishing rods which prevents the fishing line from becoming entangled.

A common problem in using fishing rods, and particularly in casting or reeling, is that the fishing line becomes entangled or snagged at the end of the fishing rod. This problem is encountered especially in fishing at night when the fisherman cannot see too well. In addition, children who are unaccustomed to handling fishing rods encounter the problem of entanglement quite frequently.

It is therefore an object of this invention to provide an attachment which may be easily mounted on the end of a conventional fishing rod and thereby prevent entanglement and snagging of the fishing line.

It is a further object of this invention to provide such an attachment which may be easily removed.

It is a further object of this invention to provide such an attachment which does not permanently change the fishing rod.

It is a further object of this invention to provide such an attachment which may be inexpensively manufactured.

In the drawings:

Fig. 1 is a side elevational view of the attachment in position on the end of a fishing rod.

Fig. 2 is a part sectional elevational view of the attachment showing the position as it is being mounted on a fishing rod.

Fig. 3 is a fragmentary sectional view similar to Fig. 1.

Fig. 4 is a fragmentary plan view of a portion of the attachment.

Fig. 5 is a sectional view taken along the line 5—5 in Fig. 3.

Fig. 6 is a sectional view taken along the line 6—6 in Fig. 3.

Referring to Fig. 1, the attachment is intended to be mounted on the end of a fishing rod 10 of conventional construction. Such a fishing rod is usually made of flexible material and comprises a plurality of loops which guide the fishing line 11 along the length of the rod including a loop 12 at the end of the rod which has the plane thereof at an angle to the axis of rod 10 and usually forms an angle of greater than 90° therewith, as shown in Fig. 2. Braces 13 are usually provided to hold loop 12 in rigid position relative to fishing rod 10.

Attachment 14 comprises a first tubular section 15 and a second tubular section 16 of larger diameter connected to the first tubular section by an intermediate tapered section 17. As shown in Fig. 1, first tubular section 15 has a length many times the internal diameter thereof, whereas, second tubular section 16 has a length several times the internal diameter thereof. Attachment 14 may be made as a single unit or in several parts which are connected to each other by threading, welding or other suitable fastening means. Attachment 14 is preferably made of aluminum but may also be made of any other rust-resisting material.

As shown in Fig. 3, second tubular section 16 has a portion of the wall thereof cut away to provide a wedge-shaped opening 18 (Figs. 3 and 4). Wedge-shaped opening 18 includes a ledge surface 19 and side surfaces 20 which permit the end of the fishing rod 10 to be brought into position such that loop 12 engages ledge surface 19 while the side surfaces 20 provide enough clearance to permit braces 13 to be moved inwardly relative to tubular section 16. The end of tubular section 16 opposite tubular section 15 is provided with a longitudinally extending groove 21 which extends between the extreme end of tubular section 16 and the wedge-shaped opening 18. This groove 21 serves as a seat for a portion of rod 10 spaced from the end thereof to assist in mounting and maintaining the attachment 14 in rigid position on the end of the rod.

Holders 22, 23 of elastic material such as rubber are used to maintain the attachment in position. Each of the holders 22, 23 comprises a ring or tube. Holder 22 is slipped over tubular section 16 in overlying relationship to the extreme end of fishing rod 10 and loop 12. Holder 23 is slipped over the tubular section in overlying relationship to groove 21 thereby clamping fishing rod 10 in the groove 21 (Fig. 5).

The attachment is mounted on the end of the fishing rod by slipping holder 23 over the end of the fishing rod and slipping holder 22 on attachment 14, as shown in Fig. 2. The attachment is then positioned on the end of the fishing rod, bringing loop 12 into engagement with ledge surface 19 and seating a portion of fishing rod 10 in groove 21. Holder 23 is then slipped onto the tubular section to clamp the fishing rod in groove 21, and holder 22 is slipped along tubular section 16 into overlying relationship with the extreme end of fishing rod 10 and loop 12. With the attachment 14 in position on the end of the fishing rod, fishing line 11 is threaded through tubular section 16 and tubular section 15. An eyelet 25 is provided in the outermost end of tubular section 15 to minimize wear on fishing line 11.

In use, the great length of tubular section 15 relative to its diameter prevents the fishing line 11 from becoming entangled around the end as might occur in casting or reeling.

The attachment may be readily and easily mounted on the end of the fishing rod or removed from the end of the fishing rod without changing or modifying the fishing rod in any manner. In addition, the attachment may be inexpensively manufactured.

An example of the relative dimensions of the attachment which I have found to give satisfactory results are as follows:

Length of tubular section 15—6"–8"
Internal diameter of tubular section 15—3/16"
Length of tubular section 16—2¼"
Internal diameter of tubular section 16—3/8"

I claim:

1. In a device adapted to be mounted on the end of a fishing rod to prevent entanglement of the fishing line, said fishing rod having a loop on the end thereof with the plane of the loop forming an angle with the axis of the fishing rod, the combination comprising a first section having an opening therethrough, the length of said opening being many times greater than the diameter thereof, a second section having an opening therethrough and fixed to said first section, the opening in said second section being aligned with the opening in said first section, said second section having portions thereof spaced from each other to provide a side opening for receiving the loop of said fishing rod to bring the opening in said loop into alignment with the openings in said sections, and means for supporting said first and second sections on the end of said fishing rod.

2. The combination set forth in claim 1 wherein said second section is provided with a contacting surface for engaging said loop.

3. The combination set forth in claim 2 wherein said second section is provided with means for engaging said fishing rod at a point spaced from the end thereof for maintaining the axis of said fishing rod in generally parallel alignment with the axis of said openings in said sections.

4. The combination set forth in claim 3 wherein said latter means comprises a groove in the outer surface of said second section, said groove extending longitudinally of said second section.

5. The combination set forth in claim 1 wherein said first and second sections are formed as an integral unit.

6. The combination set forth in claim 1 including an eyelet in the outermost end of said first section.

7. A device adapted to be mounted on the end of a fishing rod to prevent entanglement of the fishing line, said fishing rod having a loop on the end thereof with the plane of the loop forming an angle with the axis of the fishing rod, comprising an integral unit including a first tubular section having an opening therethrough, said tubular section having a length many times greater than the diameter of the opening therethrough, a second tubular section extending from one end of said first tubular section and having an opening aligned with the opening in said first tubular section, said second tubular section having a wedge-shaped opening in the side wall thereof having a portion of the edge thereof adjacent said first tubular section providing a contacting surface, said contacting surface being adapted to engage the loop on the end of said fishing rod, there being a groove on the outer wall of said second tubular section extending longitudinally thereof and adapted to receive a portion of said fishing rod, and means for maintaining said loop of said fishing rod in engagement with said contacting surface and said portion of said fishing rod in engagement with said groove.

8. The combination set forth in claim 7 wherein said means for maintaining said loop in engagement with said contacting surface and said portion of said fishing rod in engagement with said surface comprises a first generally circular holder of elastic material encircling said tubular section and adapted to press said loop inwardly of said tubular section and a second generally circular holder of elastic material encircling said second tubular section and adapted to press said portion of said fishing rod into engagement with said groove.

9. In a device adapted to be mounted on the end of a fishing rod to prevent entanglement of the fishing line, said fishing rod having a loop on the end thereof with the plane of the loop forming an angle with the axis of the fishing rod, said loop being eccentric relative to the axis of the rod, the combination comprising an integral unit having a first rigid section having an opening therethrough, the length of said opening being many times the diameter of said opening, a second rigid section having an opening therethrough and fixed to one end of said first section, the opening in said second section being aligned with the opening in said first section, said second section having a contacting surface spaced from the free end of said second section, said surface being adapted to be contacted by the loop on the end of said fishing rod, means for removably supporting said device on the end of a fishing rod with the loop of the rod in contact with said contact surface and said first section extending beyond the end of said fishing rod, said contacting surface forming an angle with the axes of said openings in said sections such that when said loop of said rod is in contact with said contact surface the axes of said openings in said sections are generally parallel to said rod.

References Cited in the file of this patent

UNITED STATES PATENTS

| 343,802 | Everett | June 15, 1886 |
| 734,544 | Hall | July 28, 1903 |
| 2,652,654 | Bahn | Sept. 22, 1953 |
| 2,735,208 | Bartletti | Feb. 21, 1956 |
| 2,781,602 | Warford | Feb. 19, 1957 |